United States Patent Office 3,847,917
Patented Nov. 12, 1974

3,847,917
AMINO DERIVATIVES OF N-HETEROCYCLICS
Helmut Vorbruggen, Berlin, Germany, assignor to Schering Aktiengesellschaft, Berlin, Germany
No Drawing. Filed Dec. 18, 1972, Ser. No. 315,820
Claims priority, application Germany, Dec. 18, 1971, P 21 63 873.3
Int. Cl. C07d 55/22
U.S. Cl. 260—249.6                                    9 Claims

ABSTRACT OF THE DISCLOSURE

Amino derivatives of N-heterocyclic compounds are prepared by a process which comprises silylating a corresponding hydroxy and/or mercapto substituted N-heterocyclic compound, and reacting the resultant O- or S-silyl derivative with ammonia or a primary or secondary amine of the formula $HNR_1R_2$, or with a salt of primary or secondary amine in the presence of a tertiary amine, and hydrolyzing the silylated compound with a catalytic amount of a Lewis acid.

BACKGROUND OF THE INVENTION

This invention relates to amino derivatives of N-heterocyclics. In particular, this invention relates to a process for preparing mono- and polyamino derivatives of aromatic N-heterocyclic compounds, and to certain novel compounds thereby produced.

The compounds producible according to the process of this invention have a wide range of application. For example, 4-pyrrolidinopyridine is a hypernucleophilic acylation catalyst popular in organic chemistry; see Tetrahedron Letters 54:4727 (1970). Furthermore, several reaction products are valuable drugs; e.g., trimethoprim is a well-known bactericide. Other reaction products are valuable intermediates for the production of medicines. Thus, it is possible, for example, to prepare the corresponding nucleosides from the substituted adenines, diazines and triazines, in a manner, described in detail in U.S. patent application Ser. No. 26,783, filed Apr. 8, 1970, now U.S. Pat. No. 3,748,320, issued July 24, 1973.

It is surprising that the amino derivatives of this invention are produced in the reaction of the silyl compound with the amine in the presence of a Lewis acid. Such compounds have been obtained heretofore by the amination of corresponding chlorine compounds. However, the chlorine compounds are often only difficultly obtainable, since considerable decomposition can occur during the reaction of the hydroxy-N-heterocyclics with phosphorus oxychloride or phosphorus pentachloride. Furthermore many compounds are quite sensitive against treatment with phosphorus oxychloride. Thus, sensitive groups like aliphatic alcohols have to be protected by acylation before treatment with phosphorus oxychloride or phosphorus pentachloride.

OBJECTS OF THE INVENTION

It is a general object of this invention to provide an improved process for preparing amino derivatives of N-heterocyclics.

Other objects of this invention will become apparent to those skilled in the art from the following discussion of the invention.

SUMMARY OF THE INVENTION

This invention provides a process for preparing amino derivatives of an aromatic N-heterocyclic compound of 5–15 members containing a total of 1–7 hetero atoms which, in addition to the nitrogen atom, can be nitrogen, oxygen or sulfur, which comprises:

(a) silylating a hydroxy and/or mercapto ring substituted derivative of said N-heterocyclic compound to form a corresponding O-silyl or S-silyl derivative, respectively; and (b) reacting the resultant silyl derivative, in contact with a catalytic amount of a Lewis acid, with ammonia or with an amine of the formula $HNR_1R_2$ wherein:

(i) $R_1$ and $R_2$ are each hydrogen, alkyl of 1–6 carbon atoms, or one of $R_1$ and $R_2$ is aralkyl of 7–10 carbon atoms, aryl, or a heterocyclic ring of 4–7 members containing 1–3 hetero atoms selected from the group consisting of nitrogen, oxygen and sulfur; or (ii) $R_1$ is hydrogen and $R_2$ is hydroxy, amino, alkyl of 1–4 carbon atoms unsubstituted or terminally substituted with mono- or di-lower alkyl amino; or (iii) $R_1$ and $R_2$, collectively with the nitrogen atom, form an N-heterocyclic ring of 4–7 members and containing, in addition to the nitrogen atom, 0–2 hetero atoms selected from the group consisting of nitrogen, oxygen and sulfur; or (iv) a salt of said amine together with 1–2 moles of tertiary amine base per mole of said salt, to split off the O-silyl and S-silyl groups and form the corresponding amino derivative of said aromatic N-heterocyclic compound.

DETAILED DISCUSSION

Suitable N-heterocyclics are mono- and polycyclic ring systems containing 1–3 hydroxy and/or mercapto groups on the ring; these ring systems include but are not limited to oxazoles, imidazoles, pyridines, quinolines, isoquinolines, pyridazines, pyrimidines, pyrazines, triazines, purines, acridines, pteridines, resp. benzopteridines and indolenines.

Depending on the number of hydroxy and/or mercapto groups on the ring skeleton, 1, 2 or 3 amino groups can be introduced according to the process of this invention.

The hydroxy and mercapto derivatives of N-heterocyclics utilized in accordance with this process can contain still further substituents. Preferred substituents in this connection are amino, alkyl or aryl substituted amino, e.g., phenethylamino, 4-amino-1-methylbutylamino, and 4-diethylamino-1-methylbutylamino; alkyl, aryl or alkoxy substituted alkyl, e.g., benzyl and trimethoxybenzyl; aryl, e.g., phenyl; substituted aryl, e.g., p-chlorophenyl; halo, hydroxy, alkoxy, etc.

Alkyl and alkoxy are preferably lower alkyl and lower alkoxy of 1–4 carbon atoms.

As the amine component $HNR_1R_2$, primary as well as secondary aliphatic, alicyclic or heterocyclic amines can be employed. Suitable amine components of the formula $HNR_1R_2$ are those in which $R_1$ and $R_2$ are each hydrogen, alkyl of 1–6 carbon atoms, aralkyl of 7–10 carbon atoms unsubstituted or substituted with hydroxy or alkoxy with 1–4 carbon atoms, aryl unsubstituted or substituted with hydroxy or alkoxy of 1–4 carbon atoms, a heterocyclic ring of 4–7 members containing a total of 1–3 hetreo atoms which can be nitrogen, oxygen or sulfur; or when $R_1$ is hydrogen $R_2$ is hydroxyl, amino, alkyl of 1–4 carbon atoms substituted in the terminal position with a mono- or dialkylamino group, containing 1–4 carbon atoms in each alkyl group, or a mono- or bicyclic heterocyclic group of 5–10 members containing a total of 1–3 hetero atoms, which can be nitrogen, oxygen and sulfur, or $R_1$ and $R_2$, together with the N-atom, collectively represent a heteromonocyclic ring of 4–7 members containing a total of 1–3 hetero atoms which, in addition to the nitrogen atom, can be nitrogen, oxygen or sulfur, unsubstituted or substituted by an alkyl group with 1–4 carbon atoms.

The silylation of the hydroxy and mercapto groups is conducted with hexamethyldisilazane in the presence of trimethylchlorosilane or an ammonium salt, optionally with the addition of a tertiary amine base, such as pyridine, under reflux. Any primary and secondary amino groups existing in the starting heterocyclic molecule are simultaneously silylated. These N-silyl groups are split off again during the subsequent reaction with ammonia or an amine in the presence of a Lewis acid.

It is unnecessary in the reaction of this invention to isolate the intermediate silyl compounds. The trimethylsilyloxy or trimethylsilylthio compounds formed in situ can be directly reacted in the reaction solution with ammonia or an amine to obtain the corresponding amino derivatives.

The specific type of reaction used depends on the particular type of compound $HNR_1R_2$ and on the catalyst. The treatment of the silyl compound with primary or secondary amines generally takes place at 0° to 180° C., preferably at 100–160° C. When employing primary and secondary amine salts, the reaction is conducted in the presence of a tertiary amine, wherein the amine salt can simultaneously serve as the catalyst. The tertiary amine is generally used in an amount of 1–5, preferably 1–2 mole per mole of primary or secondary amine salt.

Suitable tertiary amines include but are not limited to trimethylamine, triethylamine, ethyldiisopropylamine, pyridine and quinoline. Preferred tertiary amines are triethylamine, ethyldiisopropylamine and pyridine.

Suitable primary amines include but are not limited to methylamine, ethylamine, propylamine, butylamine, aniline, p-anisidine, benzylamine, homoveratrylamine, tryptamine N,N-dimethylethylenediamine and $\beta$-phenethylamine.

Preferred primary amines are benzylamine, homoveratrylamine and $\beta$-phenethylamine.

Suitable secondary amines include but are not limited to dimethylamine, diethylamine, pyrrolidine, piperidine, morpholine, hexamethylenimine and N-methylpiperazine. Preferred secondary amines are pyrrolidine, piperidine, morpholine and N-methylpiperazine.

Since primary amines will react directly with the silylating agent, the primary amine must be added after the formation of the silyl compound and after removal of the silylating reagent.

In contrast to the primary amines, the secondary amines react only reluctantly with the silylating agent. Therefore, if desired, the silylating agent and the secondary amine can be employed simultaneously.

The reaction with ammonia is effected under an $NH_3$-pressure of about 30–50 atmospheres gauge. The reaction is terminated after about 1–8 days at 0° to 180° C. When silylating with hexamethyldisilazane, free ammonia is liberated and the silylation and reaction with ammonia can be conducted in a single stage.

A much preferred solvent for the reaction is excess amine $HNR_1R_2$; however, likewise suitable for this purpose are inert solvents, i.e., those solvents in which the starting materials are soluble but which do not interfere with the reaction, e.g., toluene, xylene, chlorobenzene, anisole, dioxane, glyme, tetrachloroethane, or, for the more sparingly soluble silyl compounds, an aprotic solvent, preferably dimethylformamide or sulfolane.

Suitable catalysts are the Lewis acids, particularly metallic salts and salts of amines. The metallic salts are optionally utilized in the reaction together with excess amine $HNR_1R_2$. The catalysts are used in this reaction in catalytic amounts of generally from 0.001 mole to 5 moles, preferably in quantities of 0.05–1 mole, based on the N-heterocycle. The most effective and preferred catalysts are mercury(II) chloride, mercury(II) acetate, tin(IV) chloride, zinc(II) chloride, titanium(IV) chloride and boron trifluoride etherate, which are employed in combination with excess amine, and salts of amines with an inorganic anion, e.g., ammonium sulfate, $\beta$-phenethylamine hydrochloride, homoveratrylamine hydrochloride, etc. optionally with addition of a tert. base.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, unless otherwise indicated, all temperatures are in degrees Celsius and all parts and percentages are by weight.

EXAMPLE 1

$N^6$-$\beta$-Phenethyladenine 2.72 g. (20 millimoles) of hypoxanthine was dissolved in 75 ml. of hexamethyldisilazane and 0.5 ml. of trimethylchlorosilane by heating to 155° for 18 hours; the reactants were distilled off at 125°, and the residue was heated with 7.2 ml. (60 millimoles) of $\beta$-phenethylamine and 543 mg. (2 millimoles) of $HgCl_2$ at 145° for 60 hours under a nitrogen atmosphere. After the addition of 200 ml. of methanol, the mixture was refluxed for 5 hours, thus precipitating any unreacted hypoxanthine (600 mg.). After a treatment with carbon and removal of the filtrate by evaporation at 65°/0.1 mm., the remainder was extracted with boiling ethyl acetate, thus producing, upon concentration of the extract by evaporation, 3.66 g. =63.2% of $N^6$-$\beta$-phenethyladenine in several batches; m.p. 229–239°.

EXAMPLE 2

$N^6$-Butylideneadenine 2.72 g. (20 millimoles) of hypoxanthine was dissolved in 75 ml. of hexamethyldisilazane and 0.5 ml. of trimethylchlorosilane by heating to 155° for 18 hours, and the excess of the reactants was distilled off at 125°. The residue was heated with 542 mg. (2 millimoles) of $HgCl_2$ and 10 ml. (120 millimoles) of pyrrolidine for 36 hours at 120° under a nitrogen atmosphere, cooled, and refluxed for another 7 hours with 100 ml. of methanol, thus precipitating crystalline hypoxanthine (330 mg.) which was filtered off. The filtrate (5.05 g.) was evaporated and extracted six times with respectively 200 ml. of ethyl acetate, thus obtaining, upon cooling and evaporation of the mother liquors, 2.06 g.=54.5% of $N^6$-butylideneadenine, m.p. 297–300°.

EXAMPLE 3

2-Amino-6-pyrrolidinopurine 3.02 g. (20 millimoles) of guanine was dissolved in 75 ml. of hexamethyldisilazane and 0.5 ml. of trimethylchlorosilane by heating to 155° for 57 hours, and the excess of the reactants was distilled off at 125°. The residue was heated with 10 ml. (120 millimoles) of pyrrolidine and 543 mg. (2 millimoles) of $HgCl_2$ for 36 hours to 120° under a nitrogen atmosphere, cooled, and refluxed for 3 hours after adding 200 ml. of methanol, thus precipitating 500 mg. of guanine, which was filtered off. The brown filtrate was decolorized with carbon and concentrated by evaporation. The residue yielded in several batches, from methanol, 2.64 g.=64.6% of 2-amino-6-pyrrolidinopurine, m.p. 263–266°.

EXAMPLE 4

4-Pyrrolidinopyridine 9.51 g. (0.1 mole) of distilled 4-pyridone was silylated by heating in 125 ml. of hexamethyldisilazane and 0.5 ml. of trimethylchlorosilane for 4.5 hours; the excess reactants were distilled off at 125°, and the residue was heated with 50 ml. (0.6 mole) of pyrrolidine and 2.715 g. of $HgCl_2$ (0.01 mmole) for 32 hours to 120° under a nitrogen atmosphere. After cooling and adding 200 ml. of methanol, the reaction mixture was refluxed for 3 hours, treated with carbon, and the filtrate evaporated. After repeated extraction with a total of 600 ml. of boiling pentane, 9.41 g.=63.5% of crystalline 4-pyrrolidinopyridine was obtained, melting at 57° after recrystallization from pentane.

EXAMPLE 5

2-Butylideneamino-3H-indolenine 13.3 g. (0.1 millimole) of oxindole was silylated by boiling for one hour in 100 ml. of hexamethyldisilazane, and the excess reactant was evaporated at 125°. The residue was mixed with 25 ml. (0.3 millimole) of pyrrolidine and, at 0°, gently with 1.2 ml. (0.01 millimole) of SnCl$_4$; thereafter, the reaction mixture was heated at a bath temperature of 120° for 60 hours under nitrogen. The blackish-brown solution was refluxed for 3 hours with 200 ml. of methanol, thus precipitating 0.132 g. of substance which was filtered off. The dark filtrate was evaporated, and the black residue was extracted with 8× 250 ml. of ether, thus producing 9.3 g.=53.5% of 2-butylidene-amino-3H-indolenine, m.p. 134–137° after recrystallization from ether.

EXAMPLE 6

9-(β-Diethylaminoethyl)aminoacridine 5.86 g. (30 millimoles) of acridine was suspended in 200 ml. of hexamethyldisilazane with 1 ml. of trimethylchlorosilane and 200 ml. of CH$_3$CN and agitated at a bath temperature of 145° for 72 hours. Thereafter, the mixture was distilled off and the yellowish-green, partially crystalline residue was mixed with 17 ml. (120 millimoles) of β-diethylaminoethylamine and 815 mg. (3 millimoles) of HgCl$_2$. The thus-produced yellow suspension was refluxed under agitation at a bath temperature of 145° for another 8 hours, thus obtaining a complete solution. Thereafter, the latter was concentrated, evaporated three times with respectively 50 ml. portions of xylene, and the residue was refluxed for 3 hours in 300 ml. of methanol and evaporated. The remaining substance was extracted 5 times with respectively 300 ml. of hot ether. Upon concentration of these extracts, 8.45 g. of a crude product was obtained, which was dissolved in 500 ml. of absolute ether. By introducing HCl, the dihydrochloride was produced which, after washing with ether, was recrystallized from 300 ml. of absolute ethanol, thus obtaining 5.895 g.=52% of 9 - (β-diethylaminoethyl)aminoacridine·2 HCl, m.p. 247–249°.

EXAMPLE 7

2-Benzylaminoquinoline 4.356 g. (30 millimoles) of 2-hydroxyquinoline was silylated by 19 hours of refluxing in 100 ml. of hexamethyldisilazane and 0.5 ml. of trimethylchlorosilane; the excess reactants were distilled off, and the light-brown, clear residue was heated with 9.8 ml. (90 millimoles) of benzylamine and 815 mg. (3 millimoles) of HgCl$_2$ to 145° for 74 hours. After boiling in 200 ml. of methanol for 3 hours, the reaction mixture was decolorized with carbon, the filtrate was evaporated, and the oily residue was extracted three times with respectively 100 ml. of H$_2$O at 60°. Upon cooling, 0.35 g. of pure 2-hydroxyquinoline was crystallized from the aqueous extracts. The water-insoluble portion was washed in 200 ml. of chloroform again with 30 ml. of 2N NaOH and, after drying (MgSO$_4$) and evaporation, 8.7 g. of a partially crystalline, brown residue was obtained which was extracted five times with 100 ml. of boiling hexane, thus obtaining 8.4 g. of a crude final product; upon cooling, 5.72 g.=81.4% of 2-benzylaminoquinoline, m.p. 98–99°, was produced from boiling benzene.

EXAMPLE 8

2,4-Bis(β-phenethylamino)pyrimidine 3.36 g. (30 millimoles) of uracil was silylated by refluxing for 19 hours in 100 ml. of hexamethyldisilazane and 0.5 ml. of trimethylchlorosilane; the excess reactants were distilled off. The light-yellow, oily residue was mixed with 12.65 ml. (100 millimoles) of β-phenethylamine and 0.815 g. (3 millimoles) of HgCl$_2$, thus precipitating a colorless substance. After 74 hours at 145°, 200 ml. of methanol was added thereto and the mixture refluxed for 3 hours. The yellow precipitate of mercury compounds was filtered off, the filtrate was evaporated, and the residue was washed in 200 ml. of chloroform with 30 ml. of 2N NaOH. After drying (MgSO$_4$) and evaporation of the chloroform, the residue was extracted with 1 liter of boiling n-hexane. Upon cooling, an oxidation product (0.48 g.) was crystalized having a melting point of 140°. The mother liquors were chromatographed in ethyl acetate on neutral aluminum oxide (100 g. AIII) in ethyl acetate-methanol (98:2), thus obtaining 6.93 g.=72.5% of an oily final product.

EXAMPLE 9

3,5-Bis(β-3,4-dimethoxyphenethyl)-1,2,4-triazine 2.583 g. (20 millimoles) of 2-thio - 6 - azauracil was silylated by heating in 75 ml. of hexamethyldisilazane and 0.5 ml. of trimethylchlorosilane for 16 hours at a bath temperature of 155°; the excess of the reactants was distilled off. The residue was allowed to react with 10 ml. (60 millimoles) of homoveratrylamine and 0.26 ml. (2.2 millimoles) of SnCl$_4$ at a bath temperature of 145° for 48 hours under nitrogen. After the addition of 200 ml. of methanol, the mixture was refluxed for 4 hours, the thus-precipitated brown substance was filtered off (0.873 g.), and the filtrate was removed by evaporation. After extraction with 4× 125 ml. of boiling ethyl acetate, the dark-colored extract was decolorized with carbon and evaporated. The residue (10.2 g.) was chromatographed with ethyl acetate on 350 g. of aluminum oxide (AIII, neutral). With ethyl acetate-methanol 98:2, 5.15 g.=58.5% of pure 3,5-bis(β - 3,4 - dimethoxyphenethyl)-1,2,4-triazine was eluted, which was crystallized from hot toluene, m.p. 136–137°.

EXAMPLE 10

2,4,6-Tris(1-pyrrolidyl)-s-triazine 129 g. (0.1 millimole) of cyanuric acid was silylated in 75 ml. of hexamethyldisilazane, 50 ml. of pyridine, and 15 ml. of trimethylchlorosilane at 140° by heating for 20 hours. The excess reactants were evaporated, and the mixture was heated in 64 g. (0.9 millimole) of pyrrolidine and 24.4 g. (0.09 millimole) of HgCl$_2$ at a bath temperature of 125° for 24 hours under a nitrogen atmosphere. After the addition of 200 ml. of methanol, the mixture was refluxed for 4 hours with methanol, concentrated, and unreacted cyanuric acid was filtered off. After removing the filtrate by evaporation, the residue was extracted with ethyl acetate and the extract filtered over 20 g. of silica gel. The eluate was crystallized from ethanol, yielding 11.7 g.=40.5% of 2,4,6-tris(1-pyrrolidyl)-s-triazine, m.p. 187–189°.

EXAMPLE 11

2,4-Diaminouracil-Picrate 2.24 g. (20 millimoles) of uracil was suspended in 200 ml. of hexamethyldisilazane and 5 ml. of methyl glycol. The suspension was mixed with 1.086 g. (4 millimoles) of HgCl$_2$ and ammonia was introduced for 30 minutes at room temperature; then, the reaction mixture was heated in an autoclave for 10 days at an internal temperature of 180°. Thereafter, the mixture was cooled to room temperature, and the thus-produced black-brown crystals were flushed out with methanol. After refluxing for 4 hours in 300 ml. of methanol, the mixture was treated with activated carbon and evaporated. After dissolution in 50 ml. of 95% ethanol, the solution was mixed with a solution of 6.0 g. of picric acid in 110 ml. of 95% ethanol. The immediately formed yellow precipitate was boiled for 10 minutes on a water bath, cooled to room temperature, and filtered. The precipitate was washed with ethanol, thus yielding 57.4% of 2,4-diaminouracilpicrate, m.p. 296–299° (from about 240°, decomposition and sublimation).

EXAMPLE 12

Trimethoprim 2.92 g. (0.01 mole) of 5-(3',4',5'-trimethoxybenzyl)-uracil, m.p. 238–239°, was mixed in 20 ml. of hexamethyldisilazane, 20 ml. of glycol dimethyl ether (glyme), and 5 ml. of methyl glycol with 0.543 g. (0.002 mole) of mercury(II) chloride, and gaseous $NH_3$ was introduced for 30 minutes at 24°. After heating to 180° for 10 days under agitation in an autoclave, the reaction mixture was cooled, the content flushed out with 300 ml. of methanol, and refluxed for 4 hours. After treatment with carbon, the mixture was filtered in the hot state, and the filtrate was evaporated. After dissolving in 10 ml. of hot 10% strength acetic acid, the reaction mixture, after another carbon treatment, was gently precipitated with 4N NaOH, thus obtaining 1.83 g. (63%) of pure crystallyine 2,4-diamino-5-(3',4',5' - trimethoxybenzyl)-pyrimidine (trimethoprim), m.p. 213°.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing amino derivatives of an aromatic N-heterocyclic compound of 5–15 members containing a total of 1–7 hetero atoms which, in addition to the nitrogen atoms, can be nitrogen, oxygen or sulfur, which comprises:
    (a) silylating an N-heterocyclic compound selected from the group consisting of oxazoles, imidazoles, pyridines, quinolines, isoquinolines, pyridazines, pyrimidines, pyrazines, triazines, purines, acridines, pteridines, benzopteridines and indolenines bearing at least one of a ring hydroxy and a ring mercapto group, to form a corresponding O-silyl or S-silyl derivative, respectively; and
    (b) reacting the resultant silyl derivative, in contact with a catalytic amount of a Lewis acid, with ammonia or with a primary or secondary amine or a salt of said amine together with 1–2 moles of tertiary amine base per mole of said salt, to split off the O-silyl and S-silyl groups and form the corresponding amino derivative of said aromatic N-heterocyclic compound.

2. A process according to Claim 1 wherein said N-heterocyclic compound is reacted with a primary amine selected from the group consisting of methylamine, ethylamine, propylamine, butylamine, aniline, p-anisidine, benzylamine, homoveratrylamine, tryptamine, N,N-dimethylethylenediamine and β-phenethylamine; a secondary amine selected from the group consisting of dimethylamine, diethylamine, pyrrolidine, morpholine, hexamethylenimine and N-methylpiperazine; a tertiary amine selected from the group consisting of trimethylamine, triethylamine, ethyldiisopropylamine, pyridine and quinoline; or a salt thereof of said amine together with 1–2 moles of tertiary amine base per mole of said salt.

3. A process according to Claim 2 wherein said silylation is effected with hexamethyldisilazane.

4. A process according to Claim 3 wherein said silylation is further effected with the addition of a tertiary amine base under reflux.

5. A process according to Claim 3 wherein the silyl compounds are reacted directly in the reaction solution with ammonia or said amine without isolation of said silyl compounds from said reaction solution.

6. A process according to Claim 2 wherein said amine is a primary or secondary amine salt which simultaneously serves as said Lewis acid catalyst.

7. A process according to Claim 2 wherein said amine is a primary amine and wherein said amine is added after the formation of said silyl compound and the removal of said silylataing agent.

8. A process according to Claim 2 wherein said amine is a secondary amine and wherein the amine is employed simultaneously with said silylating agent.

9. A process according to Claim 2 wherein said Lewis acid catalyst is selected from the group consisting of mercury(II) chloride, mercury(II) acetate, tin(IV) chloride, zinc(II) chloride, titanium(IV) chloride and boron trifluoride etherate.

References Cited

UNITED STATES PATENTS 3,639,399   2/1972   Daugherty et al. ___ 260—249.5

JOHN M. FORD, Primary Examiner

U.S. Cl. X.R.

260—248 AS, 256.4 R, 288 R, 279 R, 326.15, 296 R, 252, 249.5, 249.8, 307 R, 309, 250 A, 250 R, 251.5, 247.5 R, 247.5 B, 268 R, 268 BC, 268 BO

UNITED STATES PATENT OFFICE
CERTIFICATE OF CORRECTION

Patent No. 3,847,917　　　　　　　　　　Dated　November 12, 1974

Inventor(s)　Helmut Vorbruggen

It is certified that error appears in the above-identified patent and that said Letters Patent are hereby corrected as shown below:

IN THE HEADING, COLUMN 1:

The address for the Assignee of Record should read
-- Berlin and Bergkamen, Germany --.

IN THE CLAIMS:

Claim 1, Column 7, line 4 of the Claim:

"atoms" should read -- atom --.

Column 8, Claim 2 should read as follows:

-- 2. A process according to Claim 1 wherein said silyl derivative is reacted with a primary amine selected from the group consisting of methylamine, ethylamine, propylamine, butylamine, aniline, p-anisidine, benzylamine, homoveratrylamine, tryptamine, N,N-dimethylethylenediamine and $\beta$-phenethylamine; a secondary amine selected from the group consisting of dimethyamine, diethylamine, pyrrolidine, morpholine, hexamethylenimine and N-methylpiperazine; or a salt of said amine together with 1-2 moles of tertiary amine base per mole of said salt. --

Signed and sealed this 1st day of July 1975.

(SEAL)
Attest:

RUTH C. MASON
Attesting Officer

C. MARSHALL DANN
Commissioner of Patents
and Trademarks